United States Patent [19]

Holle

[11] 4,047,022

[45] Sept. 6, 1977

[54] AUTO FOCUS WITH SPATIAL FILTERING AND PAIRWISE INTERROGATION OF PHOTOELECTRIC DIODES

[75] Inventor: Werner H. Holle, Wetzlar, Germany

[73] Assignee: Ernst Leitz GmbH, Wetzlar, Germany

[21] Appl. No.: 648,785

[22] Filed: Jan. 13, 1976

[51] Int. Cl.$^2$ .............................................. G01J 1/20
[52] U.S. Cl. .................................. 250/201; 250/204; 354/25
[58] Field of Search ............. 250/201, 204, 234, 235, 250/236; 354/25; 356/4

[56] References Cited

U.S. PATENT DOCUMENTS

| | | | |
|---|---|---|---|
| 3,555,280 | 1/1971 | Richards | 250/236 |
| 3,781,110 | 12/1973 | Leitz et al. | 356/4 |
| 3,798,449 | 3/1974 | Reinheimer et al. | 250/201 |
| 3,844,658 | 10/1974 | Gela et al. | 250/201 |
| 3,846,628 | 11/1974 | Towne | 354/25 |
| 3,875,401 | 4/1975 | Stauffer | 250/201 |
| 3,958,117 | 5/1976 | Stauffer | 356/4 |

Primary Examiner—David C. Nelms
Attorney, Agent, or Firm—Gilbert L. Wells

[57] ABSTRACT

Apparatus for photoelectrically determining the position of at least one focal plane of an image inside an optical instrument comprising an optics for imaging at least one object on at least one spatial frequency filter of an optical image correlator and further comprising a measurement display of the light fluxes filtered through the spatial frequency filter. The apparatus 1–45 for receiving the light fluxes concentrated through optical components 3,4 comprises at least one photoelectric detector system 5, 6, 31, 32. This detector system has at least one row of several detectors 11-15, ... n, and electrical means 16, 17, 26-28, 33-38 are provided for pairwise interrogation of the photoelectric detectors 11-15, ... n and also for the analysis of the photoelectric signals generated during the interrogation.

7 Claims, 6 Drawing Figures

4,047,022

AUTO FOCUS WITH SPATIAL FILTERING AND PAIRWISE INTERROGATION OF PHOTOELECTRIC DIODES

BACKGROUND OF THE INVENTION

The present invention relates to instrumentation for photoelectrically determining the position of at least one focus-plane of an image within optical equipment comprising optics to image at least one object on at least one spatial frequency filter of an optical image correlator, and further comprising a display of the measured light fluxes passing through the spatial frequency filter.

The state of the art may be ascertained by reference to U.S. Pat. No. 2,254,548 and West German Patents 927,239 of Rudolf Sewig, published May 2, 1955; 961,767 of Herbert Kunz and Utz Lauterbach, published Apr. 11, 1957; 1,103,050 of Fromund Hock, published Mar. 23, 1961; and 1,263,325 of Werner Holle, published Mar. 14, 1968, the disclosures of which are incorporated herein.

The apparatus of the present invention is used to determine the position of the focus-plane of an image projected by optical equipment by means of photoelectric means, but not visual means.

To that end, apparatus comprising electrical correlators are known, in which the partial beams from the appropriate object either are fed simultaneously each to one photoelectric detector or are fed by means of an optical chopper alternatingly to a common photoelectric detector, these detectors being divided into strips for comparing the electrical signals generated in the individual strips by the partial beams, furthermore comprising a display for the comparison results after these detectors.

West German Patent 1,263,325 is based on this state of the art and describes an apparatus in which the outputs from the individual strips of the photoelectric detectors are connected to a single common differential circuit which is followed by a display system so that the sum of the absolute values of the difference signals obtained from the mutually corresponding strips is shown.

The measurements obtained from an apparatus such as disclosed in West German Patent 1,263,325 are noteworthy but fall short of good results for low illumination intensities and low contrasts. For a satisfactory analysis of distance, at least 50 strips (50 image points) are required. The manufacture of such arrays of diodes even with the present state of the art of semiconductor technology is a costly undertaking, so that the use of such an array in optical equipment, for instance in a photographic camera, appears of little advantage.

Again, methods for the focusing of images projected by optical systems are known wherein the bright and dark surfaces of raster-like test objects are applied in rapid sequence to photoelectric transducers the outputs of which on account of the alternating light application are trapezoidal pulses representing a measure of the focus as disclosed in West German Patents 927,239 and 961,767.

These methods as disclosed in West German Patents 927,239 and 961,767 suffer from drawbacks in the sense that only specially prepared test objects may be focused which are made to move quickly mechanically and which furthermore must be located at the site of the object to be measured.

A method is described in U.S. Pat. No. 2,254,548 which tests the focus of imaging optical systems by auto-collimation. The light emanating from a source is guided by the optical system to be adjusted to a photoelectric cell. When two test images coincide with the cell, there is a maximum or minimum of cell output, which is used as the criterion of focus.

The method of U.S. Pat. No. 2,254,548 also suffers from the drawback of requiring a previously prepared and previously installed test object, or several test objects.

Apparatus furthermore is known for the focusing of optical systems, wherein the light beam passing through an optical system is resolved in two parts by optical means and wherein a photoelectrically controlled Foucault edge seeks that position in which it affects in the same ratio the brightness of both parts as disclosed in West German Patent 1,103,050.

However, because of the inhomogeneous brightness distribution, the method of West German Patent 1,103,050 cannot be applied to the image correlation of arbitrary object structures.

SUMMARY OF THE INVENTION

Having in mind the limitations of the prior art, it is an object of the present invention to create an apparatus for the photoelectric determination of the position of an image wherein photoelectric currents are generated for lesser light and contrast, these currents allowing the determination of position and further requiring little cost expenditure.

This object is achieved in the present invention in that instrumentation of the kind initially cited for receiving the light fluxes concentrated through the optical components comprises at least one system of photoelectric detectors consisting of at least one row of individual detectors, and in that electrical means for the pairwise interrogation of the photoelectric detectors and also for the analysis of the photoelectric signals generated during this interrogation are provided.

A spatial frequency filter is used to this end as an oscillating raster or grating. The apparatus comprises at least two photoelectric detector systems receiving light fluxes split-up and modulated in common by the spatial frequency filter, the light fluxes passing through the diametrical parts of the imaging optics and producing via optical components mentioned above partial images of the object to be measured on the detector systems, which in turn generate photoelectric signals from the partial object imaging.

The arrangement may comprise further means for the successive interrogation of homologuous detector pairs in both detector rows, a differential amplifier and a rectifier thereafter, to form a display signal from each signal pair obtained from interrogation, the display signal being proportional to the sum of the amount of the differences between the signals of each pair.

In a further embodiment of the present invention, at least one shift register is actuated by a generator as interrogation means.

In another embodiment of the present invention, the spatial frequency filter is a row of photo-diodes in which the even and odd numbered diodes are switched to separate signal lines and in which a shift register successively interrogates adjacent diodes in pairs by means of pairs of switching transistors each pair of which having a common base. Further electrical components are provided, which process the signals from both signal lines into a display signal proportional to the sum of the differences between the signals of each signal pair.

In yet a further embodiment, two photoelectric detector systems are provided each comprising at least one row of detectors. These systems are associated with two shift registers and a synchronizing generator controlls simultaneously both shift registers.

If a self-scanning row of photo-diodes is used for focusing, preferably measuring methods requiring only one such row are used for reasons of economy. Use may be made in such a case of the known principle that optimum focus is obtained when closely adjacent image points evidence maximum differences in illumination intensities.

The present invention's combination of the optical and electrical correlation principle achieves improved performance of instrumentation for photoelectrically determining the position of a focal plane of an image especially as regards low illumination intensities and low contrasts without significant additional cost. Furthermore, the use of an oscillating raster or grating allows rougher subdivision of the diode rows. Also, it is advantageous that the cancellation of partial fluxes, occurring in the prior art optical equipment, is appreciably reduced.

BRIEF DESCRIPTION OF THE DRAWINGS

The present invention is best described by reference to the various embodiments shown in the attached drawings, wherein.

DESCRIPTION OF THE PREFERRED EMBODIMENTS

Figure 1:
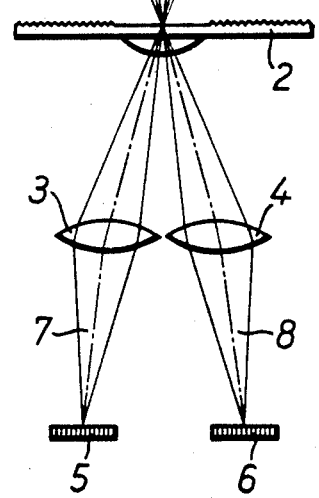
FIG. 1 is a schematic plan view of the apparatus of the present invention useful in a mirror reflex camera.

With particular reference to FIG. 1, a photographic objective of a monocular mirror reflex camera not shown in further detail is referenced by 1. The objective images the object on a view plate 2 mounted so as to be conjugate to the position of the view of image plane. The light fluxes leaving the center and non-ground (glass) part of plate 2 are made to fall on photoelectric detecting diode rows 5 and 6 by means of lenses 3 and 4, diametrical partial apertures 9 and 10 of objective 1 being used for the synthesis of partial images 7 and 8 of the object. When these partial images of the object to be recorded are focused on view plate 2 or on the film, then the corresponding individual diodes in diode rows 5 and 6 are equally illuminated from partial images 7 and 8. If there is defocusing, partial images 7 and 8 shift, so that the individual corresponding row elements are unequally illuminated.

Figure 3:
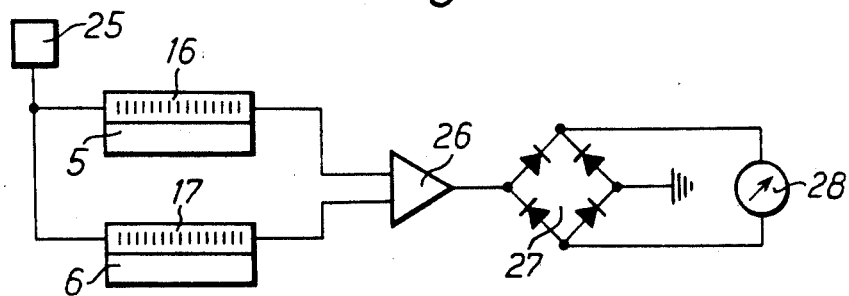
FIG. 3 is the analysis circuit diagram useful in FIG. 1.

The analysis circuit shown in FIG. 3 comprises diode rows 5 and 6 which are self-scanning rows as disclosed in LEAFLET (H15)964-6800 TWX 910-379-6552 of RETICON CORP., 365 MIDDLEFIELD R.D., MOUNTAIN VIEW, Calif. 94040, and which therefore each comprise one switching matrix and also one shift register 16,17, further a common synchronizing generator 25, a differential amplifier 26, a rectifier 27 and a display instrument 28.

Shift registers 16, 17 integrated in diode rows 5,6 switch the diodes (not shown) in those rows to their outputs. When interrogating the nth diode of row 5, the nth from row 6th also is simultaneously interrogated. The two outputs from rows 5 and 6 are applied to the differential amplifier 26 so that a potential corresponding to the particular photoelectric outputs is generated.

As long as the rows of diodes 5 and 6 are not equally illuminated everywhere, that is when there is no focus, difference pulses are obtained from differential amplifier 26 (FIG. 3), which may be of arbitrary arithmetic signs during the scanning sequence. Because of full wave rectifier 27, the differences displayed by the mean-forming instrument 28 are independent of arithmetic sign, that is, (28) display instrument is fed signals only of the same polarity and cancellations of differences of different arithmetic signs therefore are eliminated. Thus at focus the display instrument shows the value zero or a minimun reading.

Figure 2:
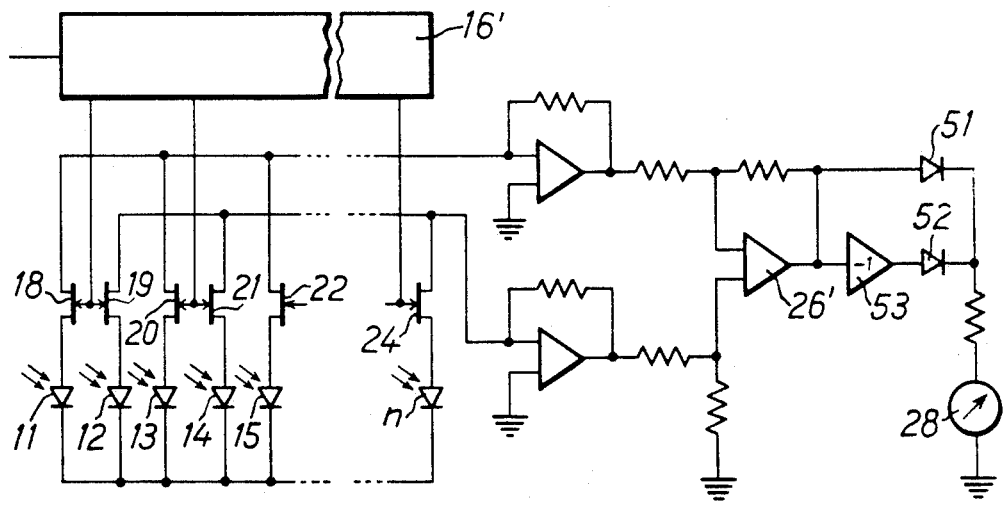
FIG. 2 is a main circuit diagram of a self-scanning row of photo-diodes.

In contrast to the apparatus of FIGS. 1 and 3, that one of FIG. 2 comprises only one row of diodes located in a plane conjugate to the viewfinder or to the image plane. The connection of shift register 16' with diodes, 11,12,13,14,15, . . . n and with the associated switching transistors 18,19,20,21,22 . . . is so chosen that two adjacent diodes (11 and 12, 13 and 14 . . . n) are always interrogated simultaneously. The generated photoelectric pulses are subtracted from one another by a differential amplifier 26'.

By means of a full-wave rectifier consisting of diodes 51 and 52 in conjunction with an inverter 53, the difference pulses are fed to a display instrument 28 without consideration of arithmetic sign. In contrast to the apparatus shown in FIGS. 1 and 3, maximum deflections or reading is obtained for focus, because in this case the adjacent diodes are subjected to the largest differences in illumination, i.e., the contrast is a maximum.

Figure 4:
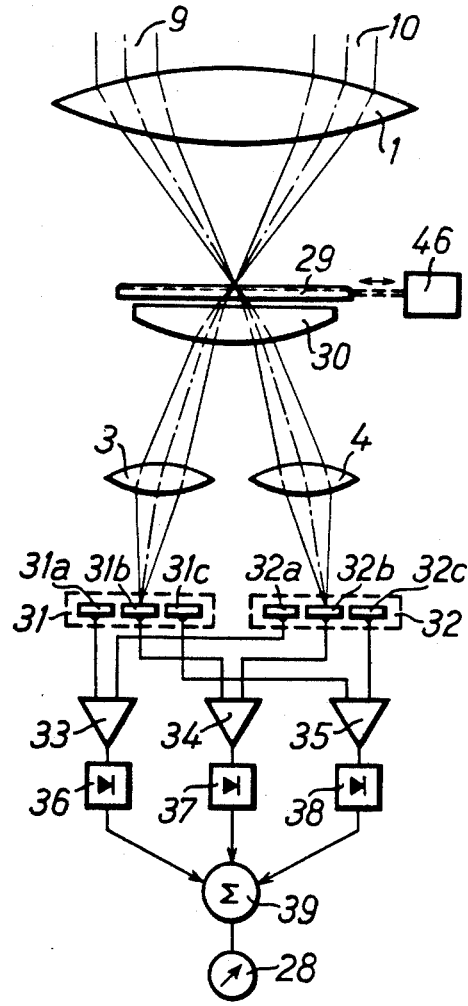
FIG. 4 is a schematic plan view of the apparatus of the present invention with an oscillating grating useful in a mirror reflex camera.

FIG. 4 shows an embodiment of the invention combined with a grating in a single lens reflex camera.

In this representation and in all to follow, the components corresponding to those of the previous figures are provided with the same reference numerals.

As is known, the object to be focused is imaged by photographic objective 1 on a grating 29. Two separate images of the object to be focused are projected by means of field lens 30 and lenses 3 and 4, making use of the partial aperture regions 9 and 10 of this objective. Photoelectric detector systems 31 and 32 comprising several detectors 31a through 31c and 32a through 32c are located in the region of the two images.

Amplifiers 33 through 35 following systems 31 and 32 form the differences from the photoelectric signals from detectors 31a and 32a and from those of corresponding detectors 31b, 32b and 31c, 32c.

Rectifiers 36 through 38 following amplifiers 33 through 35 achieve a uniform polarity in the difference currents, which are summed in a summing component 29 as $$I = |\Delta I_1| + |\Delta I_2| + |\Delta I_3| + \ldots |\Delta I_n|$$

and which then are fed to display instrument 28.

As shown in the drawing, grating 29 is movably supported and is oscillated by a drive 46 in the direction shown by the arrows. This procedure simplifies the processing of the incident photoelectric signals.

Precise focusing of the object to be measured is obtained when display instrument 28 shows a minimum or zero reading.

Figure 5:
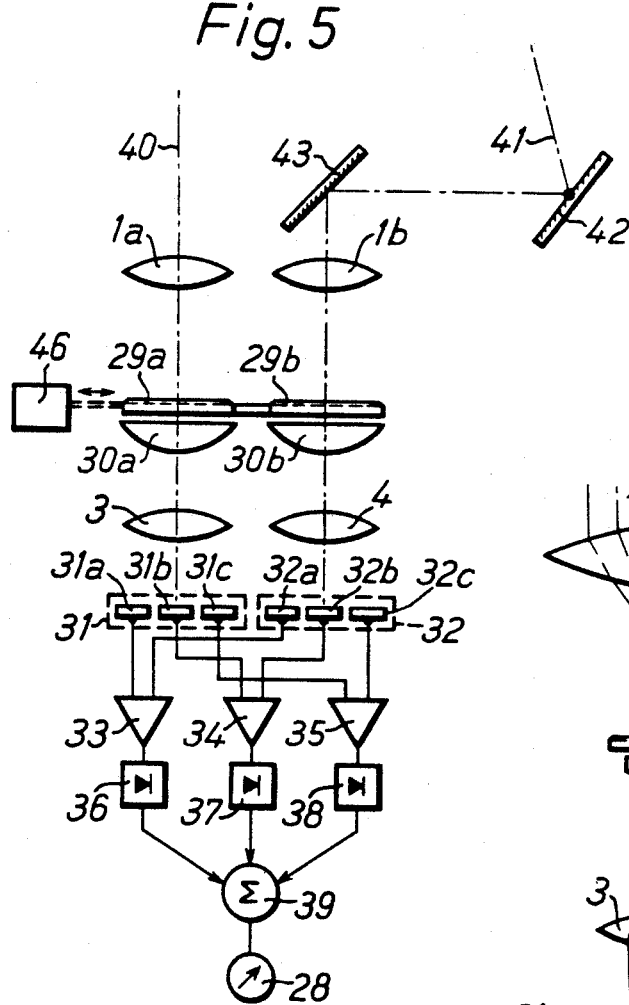
FIG. 5 is an equivalent schematic plan view of the apparatus of the present invention useful in a range-finder camera.

FIG. 5 shows an apparatus equivalent to that of FIG. 4 for a photographic rangefinder camera. In this case the object to be measured is imaged by objective 1a and 1b respectively onto grating 29a and 29b by means of viewfinder beam 40 and measuring beam 41 respectively reflected or reversed by mirrors 42,43. Field lenses 30a and 30b and also lenses 3 and 4 project images from the grating centers, and detector systems 31 and 32 located within these images. The further measuring method is as described in respect to FIG. 4.

It is understood that the arrangement shown in FIG. 4 may be extended so that in lieu of the amplitude grating or raster 29, use may be made of a prismatic grooved grating in which two further rows of diodes are used in lieu of the two rows of diodes 31 and 32, so that an optical out-of-phase or push-pull system is used, as in U.S. patent application Ser. No. 479,525.

Figure 6:
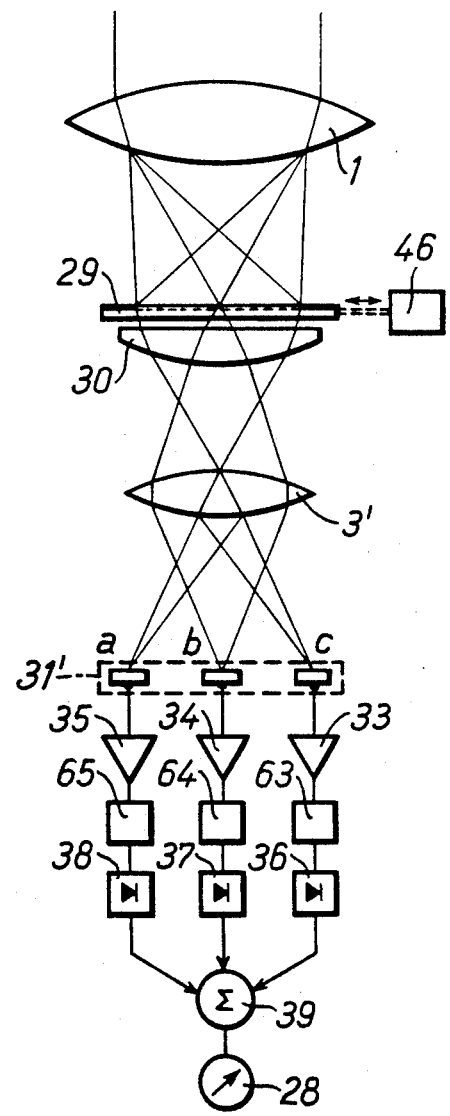
FIG. 6 is a schematic plan view of the apparatus of the present invention with a black-white raster and a photoelectric detection system.

In contrast to FIG. 4, FIG. 6 shows a simplification in the optical part. It corresponds in principle to the simplest grating correlator with a black-and-white raster and with a single photoelectric detector. Photographic objective 1 in known manner images the object to be focused on a black-white raster 29 which is oscillated by drive 46. Images of the object to be focused are projected through field lens 30 and a lens 3' — while making use of the partial aperture regions of objective 1 — on a single photo detector 31" divided into channels a, b and c. Because of the division of the image region by subdivision of photo-detector 31' and related information channels a, b and c, an appreciably larger and more reliable error signal is obtained. Corresponding to the subdivision, the band width of the spatial frequency filter is enlarged and the danger of cancellation of the signal portions of the individual image regions is reduced. Amplifiers 33, 34 and 35 are followed each by filters 63, 64 and 65, which for instance pass the natural frequencies of oscillators 46 and possibly also their harmonics. Rectifiers 36, 37 and 38 again provided phase or sign independent signals fed through summer 39 to display unit 28. The latter shows a maximum upon focusing.

I claim:

1. In an apparatus for photoelectrically determining the position of at least one focal plane of an image inside an optical instrument comprising optical components for imaging at least one object on at least one spatial frequency filter of an optical image correlator and further comprising a measurement display of the light fluxes filtered through the spatial frequency filter, the improvement comprising: means for receiving the light fluxes concentrated through said optical components having at least one photoelectric detector system consisting of at least one row of a plurality of photoelectric detecting diodes and electrical means for pairwise interrogation of said photoelectric detecting diodes and for the annalysis of the photoelectric signals generated during interrogation.

2. The apparatus of claim 1, wherein said spatial frequency filter of said optical correlator is an oscillating grating.

3. The apparatus of claim 1, wherein said means for receiving said light fluxes comprise at least two photoelectric detector systems which receive said light fluxes commonly split up and modulated by said spatial frequency filter; said light fluxes passing through diametrical parts of said imaging optics and producing via said optical components partial images of said object on said detector systems generating therefrom photoelectric signals.

4. The apparatus of claim 3, further comprising means for the successive interrogation of homologous pairs of said diodes in two rows of said diodes creating signal pairs, a differential amplifier and a rectifier which generate a display signal proportional to the sum of the absolutes of the differences of the signals of each pair of signals resulting from the interrogation of said diode rows.

5. The apparatus of claim 4, wherein at least one shift register is provided as the interrogating means, said interrogating means being synchronized by a generator.

6. The apparatus of claim 1, wherein a row of said photoelectric detecting diodes of said photoelectric detector system is provided for forming said spatial frequency filter; said photoelectric detecting diodes being joined in an interdigitally intermeshing manner, the circuit branches resulting therefrom each being connected to a separate signal line; said shift register sequentially interrogating in pairs adjacent photoelectric detecting diodes through pairs of switching transistors having pairwise common bases, and electrical components being provided, which process the signals from said signal lines into one display signal which is proportional to the sum of the differences between the signals of each signal pair.

7. The apparatus of claim 5, wherein two photodetector systems each with at least one row of said diodes are provided, and said systems are equipped with two shift registers and a synchronizing generator is provided which simultaneously controls both shift registers.

* * * * *